United States Patent
Bossemeyer, Jr. et al.

(10) Patent No.: US 6,993,121 B2
(45) Date of Patent: *Jan. 31, 2006

(54) METHOD AND SYSTEM FOR TEXT-TO-SPEECH CONVERSION OF CALLER INFORMATION

(75) Inventors: Robert Wesley Bossemeyer, Jr., St. Charles, IL (US); Mary Louise Hardzinski, Palatine, IL (US); Thomas Joseph McBlain, Arlington Heights, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/778,929

(22) Filed: Feb. 12, 2004

(65) Prior Publication Data

US 2004/0223594 A1    Nov. 11, 2004

Related U.S. Application Data

(63) Continuation of application No. 10/114,664, filed on Apr. 1, 2002, now Pat. No. 6,718,016, which is a continuation of application No. 09/240,522, filed on Jan. 29, 1999, now Pat. No. 6,400,809.

(51) Int. Cl.
*H04M 1/64* (2006.01)
*H04M 3/42* (2006.01)

(52) U.S. Cl. ............... 379/88.19; 379/88.2; 379/88.21; 379/67.1; 379/88.07; 379/88.11; 379/88.12; 379/88.16; 379/215.01; 379/207.15

(58) Field of Classification Search ............ 379/88.19, 379/67.1, 88.25, 88.27, 88.2, 88.21, 88.07, 379/88.11, 88.12, 88.16, 215.01, 205.15
See application file for complete search history.

(56) References Cited

U.S. PATENT DOCUMENTS

| | | | |
|---|---|---|---|
| 4,469,563 A | 9/1984 | Hakala | 134/2 |
| 4,899,358 A | 2/1990 | Blakely | 379/88.21 |
| 4,979,216 A | 12/1990 | Malsheen | 704/260 |
| 5,007,076 A | 4/1991 | Blakley | 379/88.21 |
| 5,157,759 A | 10/1992 | Bachenko | 704/266 |
| 5,289,530 A | 2/1994 | Reese | 379/88.01 |
| 5,309,512 A | 5/1994 | Blackmon et al. | 379/215.01 |
| 5,384,893 A | 1/1995 | Hutchins | 704/267 |
| 5,479,411 A * | 12/1995 | Klein | 379/88.13 |
| 5,481,594 A | 1/1996 | Shen et al. | 379/88.19 |
| 5,526,406 A | 6/1996 | Luneau | 455/563 |
| 5,583,920 A | 12/1996 | Wheeler, Jr. | 379/88.01 |
| 5,634,084 A * | 5/1997 | Malsheen et al. | 704/260 |
| 5,646,979 A | 7/1997 | Knuth | 455/563 |
| 5,668,928 A | 9/1997 | Groner | 704/243 |

(Continued)

*Primary Examiner*—Allan Hoosain
(74) *Attorney, Agent, or Firm*—Brinks Hofer Gilson & Lione

(57) ABSTRACT

A system (10) and method (40) for providing audible caller information to telephone service subscribers is presented. The system (10) includes a pre-processor (28) that converts textual caller information from a first data format to a second data format suitable for text-to-speech synthesis (TTS). The pre-processor (28) can be incorporated in a service node/intelligent peripheral (SN/IP) (24) in an advanced intelligent network (AIN). In this configuration, the pre-processor (28) can be used to convert caller-ID with name database entries into a predetermined TTS format. The TTS formatted information can be provided to a TTS synthesized (30) included in the SN/IP (24). In conjunction with a switching service point (SSP) (20), the pre-processor (28) can provide a talking call-waiting feature to subscribers with significantly improved intelligibility.

20 Claims, 3 Drawing Sheets

U.S. PATENT DOCUMENTS

| | | | |
|---|---|---|---|
| 5,761,640 A | 6/1998 | Kalyanswamy | 704/260 |
| 5,796,806 A | 8/1998 | Birckbichler | 379/88.2 |
| 5,812,657 A * | 9/1998 | Reding et al. | 379/242 |
| 5,822,402 A | 10/1998 | Marszalek | 379/88.21 |
| 5,852,657 A | 12/1998 | Malik et al. | 379/93.25 |
| 5,884,262 A | 3/1999 | Wise et al. | 704/270 |
| 5,890,117 A | 3/1999 | Silverman | 704/260 |
| 5,903,636 A | 5/1999 | Malik | 379/142.01 |
| 5,913,193 A | 6/1999 | Huang et al. | 704/258 |
| 5,949,865 A | 9/1999 | Fusinato | 379/221.09 |
| 5,950,163 A | 9/1999 | Matsumoto | 704/260 |
| 5,963,626 A | 10/1999 | Nabkel | 379/142.01 |
| 6,006,098 A | 12/1999 | Rathnasabapathy et al. | 455/461 |
| 6,028,921 A | 2/2000 | Malik et al. | 379/201.4 |
| 6,081,780 A | 6/2000 | Lumelsky | 704/260 |
| 6,131,082 A | 10/2000 | Hargrave, III et al. | 704/9 |
| 6,167,369 A | 12/2000 | Schulze | 704/7 |
| 6,400,809 B1 | 6/2002 | Bossemeyer, Jr. et al. | 379/88.21 |
| 6,718,016 B2 | 4/2004 | Bossemeyer, Jr. et al. | 379/88.19 |

* cited by examiner

METHOD AND SYSTEM FOR TEXT-TO-SPEECH CONVERSION OF CALLER INFORMATION

CROSS-REFERENCE TO RELATED APPLICATIONS

This application is a continuation of U.S. application Ser. No. 10/114,664, filed Apr. 1, 2002 (pending) now U.S. Pat. No. 6,718,016, which is a continuation of U.S. application Ser. No. 09/240,522, filed Jan. 29, 1999 (now U.S. Pat. No. 6,400,809). Each of those patent documents is hereby incorporated by reference herein.

TECHNICAL FIELD OF THE INVENTION

The present invention generally relates to telecommunications, and in particular, to caller identification information.

BACKGROUND OF THE INVENTION

Telecommunications systems incorporating text-to-speech synthesizers for generating audible caller information from textual data are known. U.S. Pat. No. 5,796,806 discloses an advanced intelligent network (AIN) that incorporates text-to-speech technology for presenting spoken caller information to subscribers. In this network, caller ID information, such as the caller's name and number, ordinarily presented visually to a subscriber using a special display device, is synthesized to voice information that is audibly presented to the subscriber. The textual caller information provided to the text-to-speech synthesizer is stored in phonebook-like databases.

A problem not addressed by the '806 patent is the format mismatch between the caller information databases and the input strings to the text-to-speech synthesizer. The phonebook-like textual databases are not optimized to be used as text-to-speech input. Generally, caller information in these databases is abbreviated and truncated into a compact format to reduce storage requirements. Consequently, providing compacted caller information directly to a text-to-speech synthesizer can compromise the quality of the audible output. Thus, there is a need for a spoken caller identification system that improves audible output by accounting for the formatting differences between caller databases and commercially available text-to-speech synthesizers.

BRIEF DESCRIPTION OF THE DRAWINGS

The invention is pointed out with particularity in the appended claims. However, other features of the invention will become more apparent, and the invention will be best understood by referring to the following detailed description in conjunction with the accompanying drawings, in which:

DETAILED DESCRIPTION

The present invention relates to an improved system and method for generating spoken caller information for presentation to a telephone service subscriber. The quality of the audible caller information is enhanced by reformatting textual data from a pre-existing caller database so as to improve the text-to-speech synthesis process. According to one embodiment of the present invention, a pre-processor converts existing textual caller information from a first predetermined data format stored in a conventional manner to a second data format suitable for text-to-speech synthesis. In addition to improving the quality of the audible output, the pre-processor also permits pre-existing caller information databases, such as a caller ID with name (CNAM) database, to be used with commercially available text-to-speech synthesizers. This feature of the pre-processor eliminates the need to create redundant databases of caller information formatted for a particular text-to-speech synthesizer.

Another advantage of the present invention is that it provides a system and method that permits higher quality audible caller information to be provided to a subscriber during call-waiting.

Figure 1:
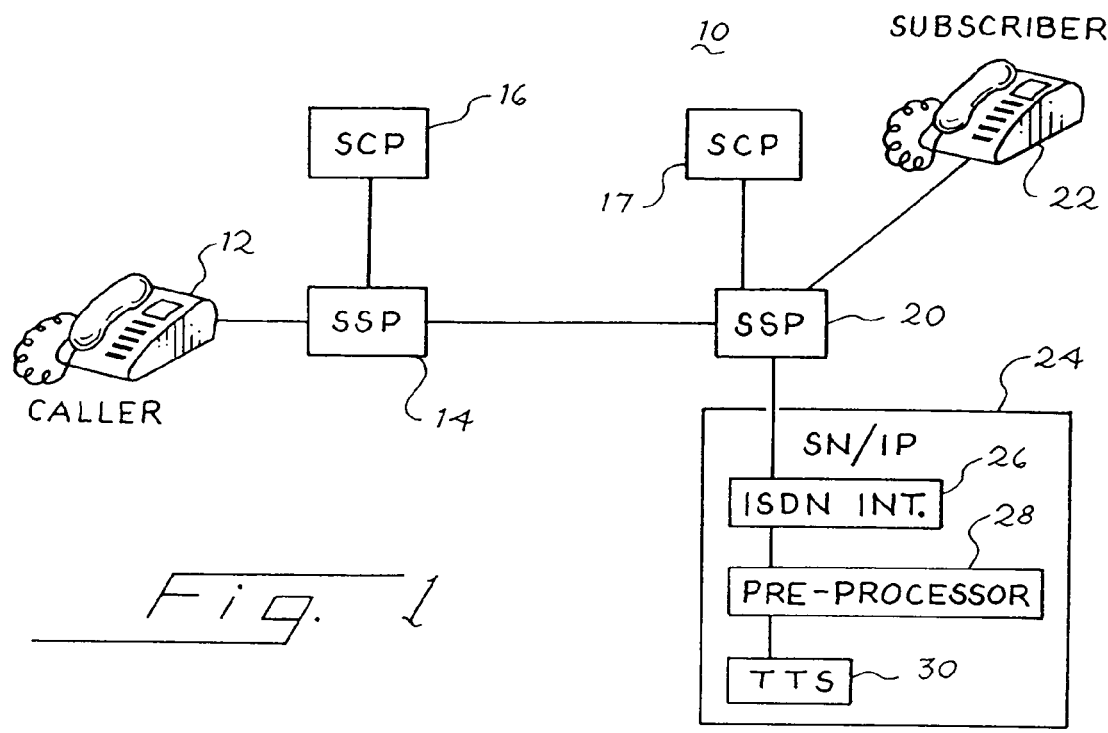
FIG. 1 is a block diagram illustrating a telecommunications system in accordance with an exemplary embodiment of the present invention.

Turning now to the drawings, and in particular to FIG. 1, an exemplary telecommunications system 10 in accordance with one embodiment of the present invention is illustrated. The telecommunication system 10 illustrates the system for providing improved audible caller information in an advanced intelligent network (AIN) implementation of a public switch telephone network (PSTN). The system 10 includes a caller terminal unit 12, such as a telephone or the like, in communication with a remote service switching point (SSP) 14. A remote service control point (SCP) 16 database server provides routing and addressing information to the remote SSP 14. The SCP 16 and SSP 14 communicate using a standard interface protocol, such as signalling system 7 (SS7).

A subscriber terminal unit 22 is coupled to a subscriber SSP 20. A local SCP 17 provides routing and addressing information to the local SSP 20. Communicating with the subscriber SSP 20 is a service node/intelligent peripheral (SN/IP) 24. The functionality of the remote and subscriber SSPs 14, 20 as disclosed herein can be implemented using any AIN compatible switch such as a 5ESS switch, manufactured by Lucent Technologies, Inc.

The SN/IP 24 can be a computer or communication server linked via an open interface to the subscriber SSP 20. In the example shown, the SSP 20 and the SN/IP 24 communicate via an integrated services digital network (ISDN) connection. The ISDN link can be implemented using either ISDN-BRI (Basic Rate Interface) or ISDN-PRI (Primary Rate Interface) protocols, which are known in the art.

The SN/IP 24 can alternatively be connected to another SSP, such as the remote SSP 14, in communication with the subscriber SSP 20.

The SN/IP 24 contains and manages resources required to offer services and service enhancements to network users. Generally, the SN/IP 24 may be used to combine advanced speech technologies and computer telephony integration (CTI) capabilities in a single platform that can be used as a network resource. The services provided by the SN/IP 24 can include speech recognition, voice or fax store and forward, dual-tone multi-frequency (DTMF) recognition with external telephony resources, text-to-speech synthesis, and the like. A compact service node (CSN) as manufactured by Lucent Technologies, Inc., can be used to provide the functionalities of the SN/IP 24 disclosed herein.

The SN/IP 24 includes an ISDN interface 26, a pre-processor 28, and a text-to-speech synthesizer (TTS) 30. The ISDN interface 26 and TTS 30 are customarily available with conventional SN/IPs, such as the Lucent CSN. In one embodiment of the present invention, the pre-processor 28 can be a software program executed by the SN/IP 24 to convert textual caller information received from the ISDN interface 26. Caller information is received in a first data format and then converted into a second data format, which is then provided to the TTS 30. Using the Lucent CSN, the pre-processor 28 can be implemented using Lucent's Service Logic Language (SLL) and Service Creation Environment (SCE), available with the CSN. In addition, the CSN includes libraries of software functions and drivers that allow the software routines of the pre-processor 28 to readily access SN/IP resources, such as the ISDN interface 26 and TTS 30.

It will be apparent to one of ordinary skill in the art that the pre-processor 28 can be equivalently implemented using only hardware components or any combination of hardware and software components. For example, the pre-processor 28 can be implemented using one or more digital applications specific integrated circuits (ASICs), designed or configured to perform the functions of the pre-processor 28 as disclosed herein.

Figure 3:
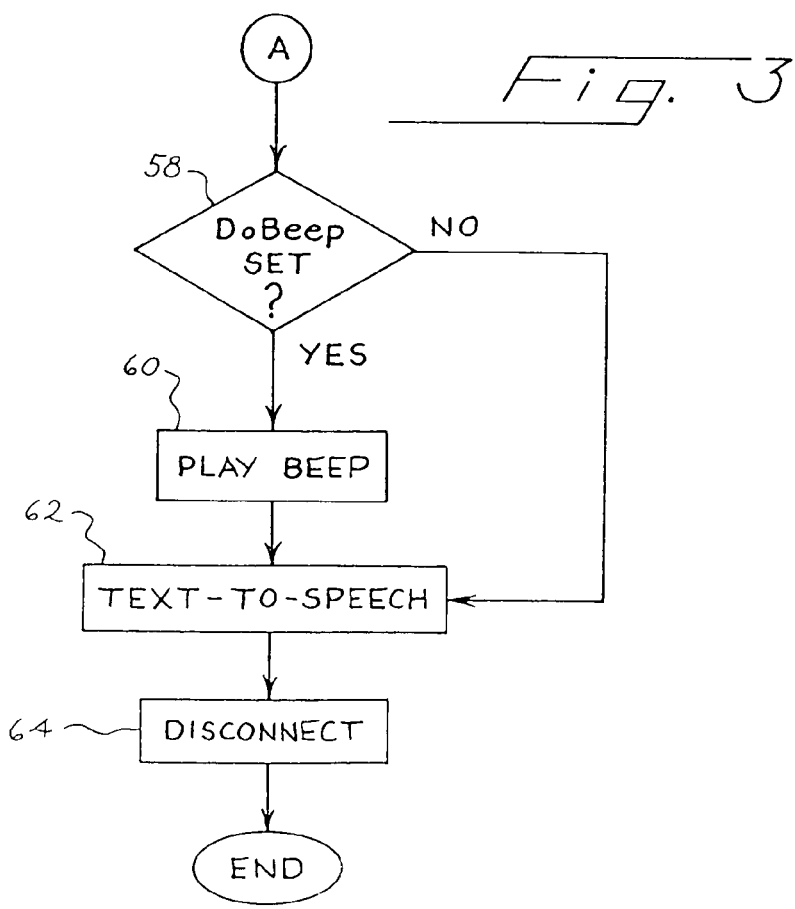
FIGS. 2–3 show a flowchart illustrating a method of operating a service note/intelligent peripheral (SN/IP) included in the system shown in FIG. 1.
Figure 2:
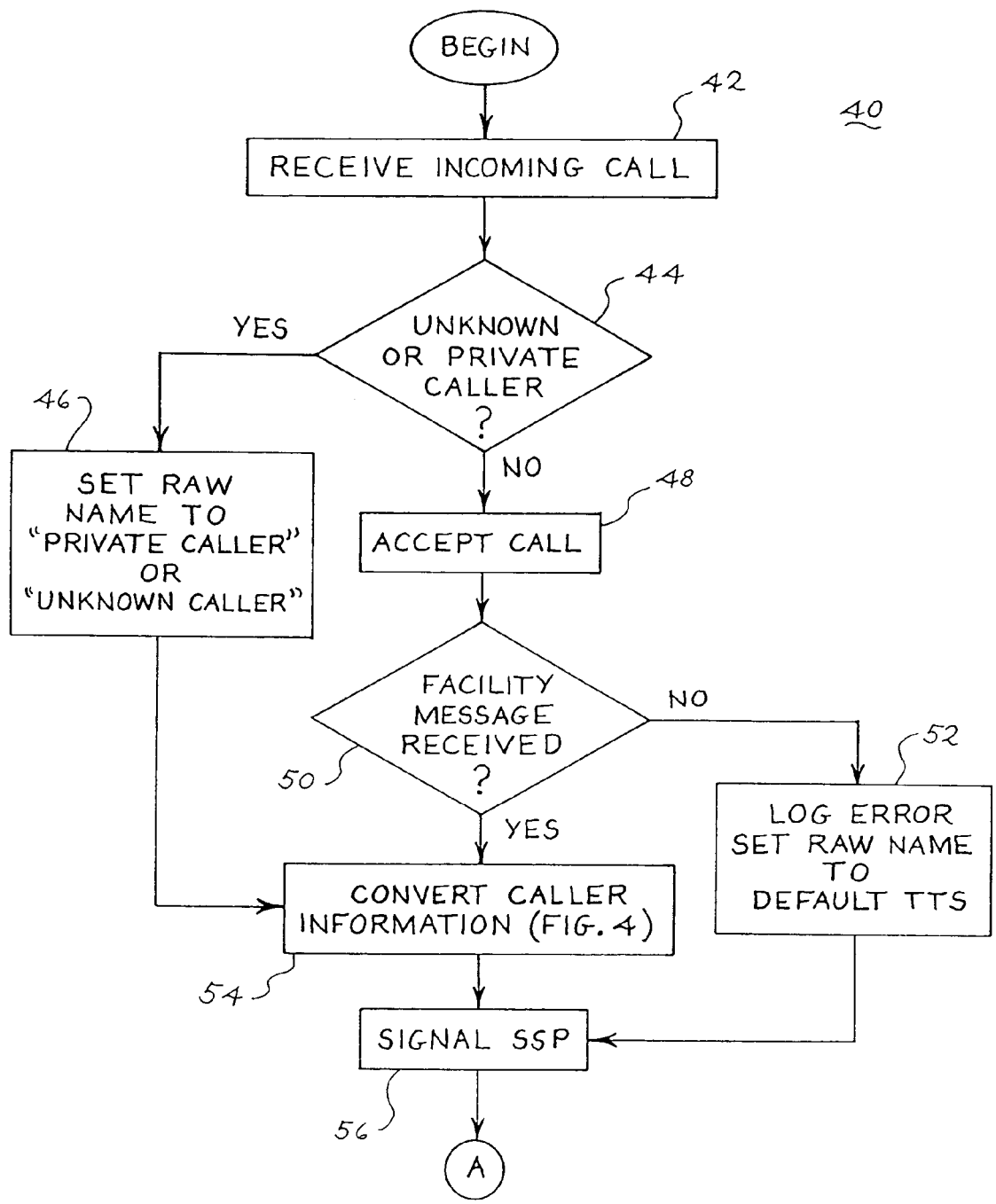

FIGS. 2–3 illustrate a flowchart diagram of a method 40 for producing audible caller information in accordance with an embodiment of the present invention. The method 40 can be implemented as a software program routine executable by the pre-processor 28.

The method 40 describes a talking call-waiting feature that presents audible caller information in conjunction with or in lieu of a conventional call-waiting "beep." Essentially, the talking call-waiting feature presents the audible caller information to a subscriber when the subscriber, already engaged in a call, receives a second incoming call from a third-party.

Turning now to the method, in step 42 an incoming call is received from the caller 12. Prior to connecting the call to the subscriber unit 22, the subscriber SSP 20 places a virtual call to the SN/IP 24.

Upon receiving the incoming call at the SN/IP 24, the pre-processor 28 checks the calling party ID parameters to determine whether the calling phone number is available or the number is marked "presentation restricted" (step 44). If the number is not available or marked "restricted", the pre-processor sets a software variable "raw name" to indicate an unknown caller or private caller, respectively (step 46). Conversely, if the incoming phone number is available and not restricted, the pre-processor 28 causes the SN/IP 24 to accept the call from the SSP 20 (step 48). In this context, "accepting", a call is an intermediate step before sending answer supervision to the SSP 20. In other words, it is equivalent to allowing ringing.

Next, in step 50, the pre-processor 28 determines whether an ISDN FACILITY message containing the textual caller information has been received from the local SSP 20. Textual caller information can be formatted to any predetermined database standard and typically includes the caller's name and phone number. In the example disclosed herein, the textual caller information received by the pre-processor is provided by a caller-ID with name (CNAM) database resident in the AIN. The format of the CNAM database restricts entries to a maximum of 15 characters, typically all in uppercase. Entries with names longer than 15 characters, particularly business names, are abbreviated and in some cases truncated.

A CNAM database is initially populated manually by an attendant from telephone listing information. Caller information entered into the CNAM database is abbreviated and truncated according to predefined sets of tables and rules.

The CNAM caller information is transferred from the SSP 20 to the SN/IP 24 using an ISDN FACILITY message. If the ISDN FACILITY message is not received within a predetermined time after accepting the call, the pre-processor 28 logs an error and sets the raw name variable to a default TTS value (step 52). However, upon successfully receiving the FACILITY message, the caller information is converted from the CNAM database format to another format suitable for text-to-speech synthesis (step 54). Details of this conversion process are provided by the method 70 shown in FIG. 4.

After conversion of the caller information is complete, the pre-processor 28 generates an answer call event. In this event, a signal is sent from the SN/IP 24 to the SSP 20, causing the SSP 20 to cut-through to the subscriber call in progress (step 56). A conventional SSP, such as the 5ESS switch available from Lucent Technologies, Inc., can provide a call-waiting feature permitting cut-through. After signalling the SSP 20 to cut-through, the pre-processor 28 waits to receive an acknowledgement from the SSP 20 indicating that the SSP 20 has successfully cut-through.

Upon receiving this indication, the pre-processor 28 determines whether to generate a conventional call-waiting "beep" prior to playing the audible caller information (step 58). If a software flag is set indicating that the call-waiting "beep" is to be generated, the pre-processor 28 causes the beep to be generated (step 60). Otherwise, the pre-processor 28 omits the "beep", and immediately performs the text-to-speech conversion generating the audible caller information to the subscriber unit 22 (step 62). After completing the text-to-speech generation, the pre-processor 28 will cause a disconnect signal to be sent to the subscriber SSP 20. This causes the SSP 20 to disengage from the SN/IP 24 service.

In addition to performing the above functions, the SSP 20 is equipped with a watchdog timer (not shown) to ensure that a malfunction in the SN/IP 24 does not indefinitely hang the talking call-waiting service provided to the subscriber unit 22. Watchdog timer functionality is customarily provided with commercially available SSPs, such as Lucent's 5ESS switch.

Figure 4:
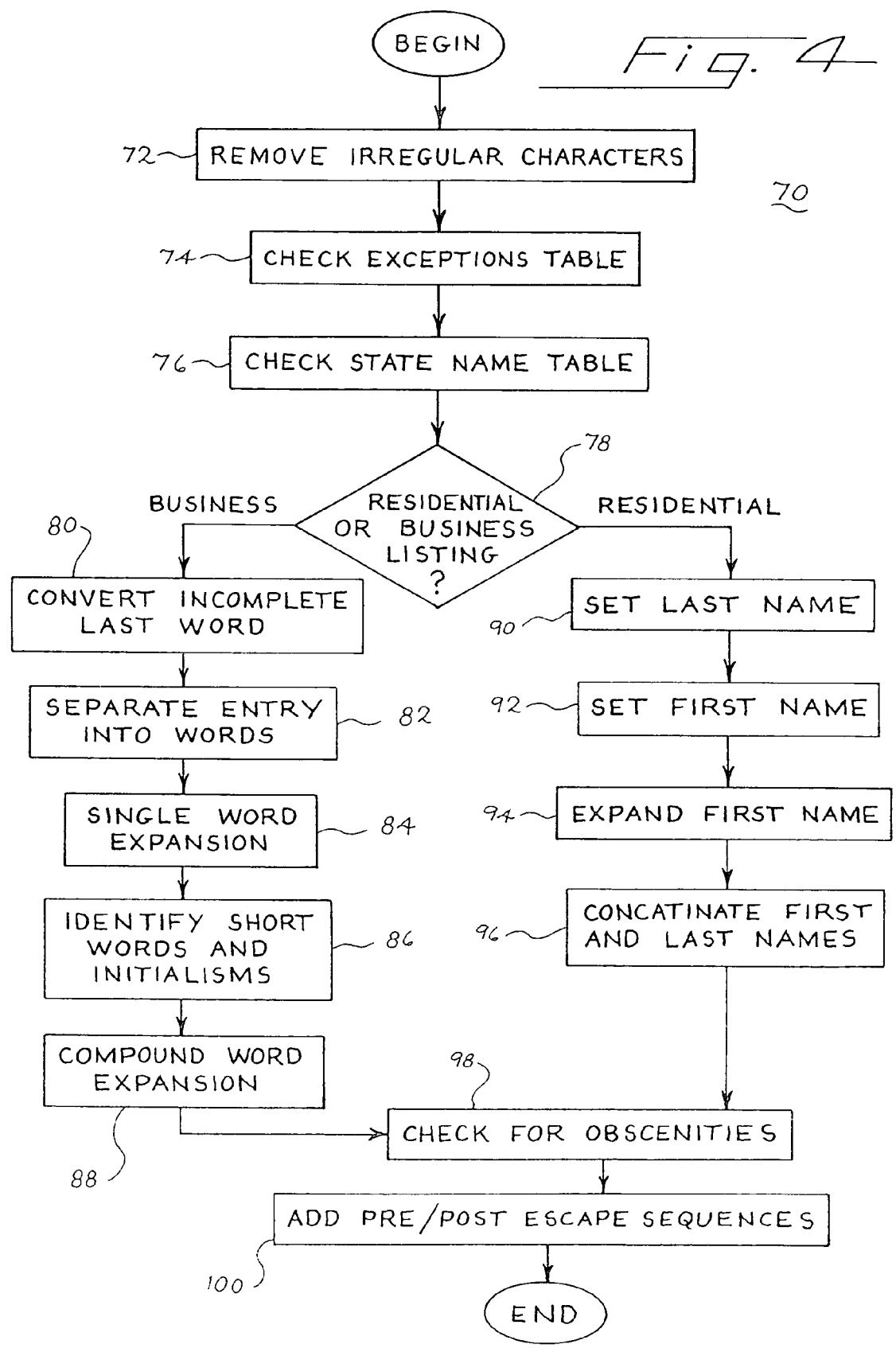
FIG. 4 shows a flowchart diagram illustrating an exemplary method of converting caller information from a compacted database format to an expanded format suitable for text-to-speech synthesis, in accordance with an aspect of the present invention.

FIG. 4 illustrates a flow diagram of a method 70 for converting textual caller information from a predetermined database format to a second format suitable for text-to-speech synthesis. The method 70 can be embodied in a set of rules stored as a software program in the pre-processor 28. To illustrate the method 70, the steps thereof will be discussed with reference to caller information formatted for storage in a CNAM database.

In step 72, raw CNAM data representing the caller information, received from the SSP 20, is first scanned to remove any irregular characters. Throughout this disclosure, the terms "CNAM data" and "CNAM entry" have the same meaning and are used interchangeably. An irregular character is defined as any character other than the following:

A–Z
a–z
0–9
, (comma)
' (apostrophe)
" " (space)

For example, if the CNAM entry comes in as "JOES TAV;RN," it would be converted to "JOES TAVRN".

Next, in step 74, the CNAM entry received from the SSP 20 is compared to an exceptions table that is stored in the SN/IP 24. The exceptions table contains a plurality of entries, each corresponding to a caller 10-digit number and its associated CNAM entry. If incoming caller information, i.e., the 10-digit number and CNAM data taken together, corresponds to a table entry, then a predetermined output string will be generated and the remaining steps 76–100 of the conversion method 70 will be skipped. The exceptions table may be used to handle exceptions to normal pronunciations and unusual names. In this manner, surnames such as "Koch" will be correctly pronounced as "Cook" instead of "Kaach". If the incoming caller information does not match an entry in the exceptions table, the method proceeds to step 76.

In step 76, the pre-processor 28 will compare the CNAM data to a state name table. This table is provided so that common CNAM entries can be easily converted. For example, CNAM data does not always represent a caller's name, and instead, will indicate that the incoming call is from a private caller or an out-of-state call, for which there is no name information. Accordingly, the state name table can include entries for incoming CNAM data that indicates a call from any of the fifty states, or US territories, foreign countries, private, unknown, cellular and pay phone calls, or any predetermined text. If a match is found in this table, steps 78–100 are skipped.

The exceptions table and state name table may be implemented as data structures storable within the SN/IP 24. The SN/IP 24 can include a software interface that permits these tables to be updated manually by an operator. If the incoming CNAM data does not correspond to an exceptions or state name table entry, the method 70 proceeds to step 78.

In step 78, a check is made to determine whether the CNAM data contains a residential or business listing. Business and residential listings are formatted differently in the CNAM database. Accordingly, separate sets of parsing rules may be provided for business and residential listings.

A comma included in a CNAM entry indicates a residential listing. Thus, in step 78, the pre-processor 28 may scan the characters included in the CNAM entry to determine the presence of a comma. If there is no comma, the CNAM entry may represent a business or entity name, and the method 70 proceeds to the steps 80–88 to convert the CNAM entry to a TTS format. Otherwise, the CNAM entry may represent a residential listing and steps 90–96 are performed to convert the CNAM entry to a TTS format.

In the case of a business listing, the pre-processor 28 may first determine whether the last word in the CNAM entry is incomplete (step 80). As mentioned above, a CNAM entry contains a maximum of 15 characters. If the entry is 15 characters long, and the last word is one or two characters only, i.e., character 14 is a space and character 15 is a non-space, or character 13 is a space and characters 14 and 15 are non-spaces, then the last word is dropped and is not converted to the TTS format. Thus, it is not spoken to the subscriber. An exception to this rule is if characters 14 and 15 are "TH". If the final word is "THE" or "TH" then the word "THE" is placed at the beginning of the pre-processor output representing the caller information, and the trailing "TH" or "THE" at the end of the CNAM entry is removed.

Next, in step 82, the CNAM is converted into separate words. The maximum number of words in a single CNAM entry is seven. The words are indexed to maintain their order. For example, a CNAM entry "A A A CHGO MTR" would result in the following pre-processor variables being set:

WORD1="A"
WORD2="A"
WORD3="A"
WORD4="CHGO"
WORD5="MTR"

In step 84, individual words included in the CNAM entry are expanded from their abbreviated form. This can be accomplished by comparing each CNAM word to a predetermined business abbreviation table stored within the SN/IP 24. Common words used in business names are abbreviated upon entering them into the CNAM database. The business abbreviation table is a database including entries for each abbreviated word. A CNAM input word included in a business name is compared against this table, and if a match is found, the table entry is substituted for the abbreviated word. Following the above example, a CNAM entry containing the following words may be expanded as:

| CNAM WORD | EXPANDED OUTPUT |
|---|---|
| CHGO | CHICAGO |
| MTR | MOTOR |

After expanding individual words, single letter words are appended with a pause escape character so that the TTS 30 will properly enunciate the single letter words.

In step 86, short words and acronyms are identified so that they are properly pronounced. An acronym is a "made up word" formed from pronounceable syllables. For example, UNICEF and NASA are two commonly used acronyms. To ensure that CNAM entries representing acronyms or short words are properly pronounced rather than spelled-out, a short word table is provided within the SN/IP 24. The short words table can be a data structure containing entries corresponding to respective two or three letter CNAM input words. If a match is found between a CNAM input and a short word table entry, the CNAM word is reformatted to be pronounced by the TTS as a single word. If the incoming CNAM word is not found in the short word table, the word is modified so that a pause occurs between each letter of the word when it is synthesized by the TTS.

In step 88, compound CNAM words are expanded. A compound CNAM word includes two or more individual words. For example, the CNAM entry "HOFF EST HS", the pre-processor would convert this entry to "HOFFMAN ESTATES HIGH SCHOOL." This compound word expansion can be accomplished using a compound business abbreviation table. Each entry in this table corresponds to a multiple word CNAM expansion. If a match is found, the substituted TTS words are used. Alternatively, compound word expansion can be accomplished using a predetermined set of matching rules and the business abbreviation table. The matching rules compare various combinations of words in the CNAM entry to combinations of entries in the abbreviation table.

Turning now to the residential listings, steps 90–96 illustrate a process of converting residential listings to a format suitable for TTS. In step 90, the last name of the caller is set to the CNAM sub-string from the beginning of the CNAM entry through to the comma in the CNAM entry. For example, CNAM entry "MC BLAIN, THOMAS" the last name would be set to "MC BLAIN."

In step 92, the first name of the caller is determined. First, the pre-processor 28 determines whether a first name is present by searching for characters to the right of the comma in the CNAM entry. If no characters are present, the first name variable is set to null. If characters are present, the pre-processor 28 checks to determine whether the first name is incomplete. If the entry is 15 characters long, and characters 14 and 15 are not spaces, then it is assumed that the first name is incomplete and only the initial of the first name will be enunciated by the TTS 30. However, if there are multiple names in the first name field of the CNAM entry, the middle name will be omitted and the full first name will be pronounced. Accordingly, the first name is set to the first character occurring after the comma through the next space.

In step 94, the first name is expanded. A residential abbreviation table is provided within the SN/IP 24. Typically, common first names are abbreviated upon entering them into the CNAM database. The residential abbreviation table includes entries for each abbreviated name. The CNAM input representing a first name is compared against this table, and if a match is found, the table entry is substituted for the abbreviated CNAM input. For example:

| CNAM INPUT | EXPANDED NAME |
|---|---|
| JOS | JOSEPH |

In step 96, the last name and first name are concatenated together, forming a variable representing the complete name.

In step 98, the expanded CNAM entry is checked against an obscenities table to determine whether the expanded name would result in an embarrassing or offensive pronunciation. If a match is found in this table, a default output is generated for that entry such as "Unknown Caller." In addition, expanded CNAM entry can be checked against a Name Pronunciation Exceptions table. This table includes a list of predetermined names, such as ethnic and non-English names, and their corresponding correct pronunciations, as represented in a TTS compatible format. If an expanded CNAM entry is found in the table, the correct pronunciation is substituted for the expanded name.

In step 100, pre-post escape sequences can be pre-pended and appended to the reformatted caller information. Typically, these escape sequences include symbols causing the TTS 30 to generate silent pauses between initial and last names of residential entries and between single letters in business entries. The pauses are ordinarily on the order of 20 milliseconds.

In sum, there has been disclosed herein an improved method and system for presenting spoken caller information to a telephone service subscriber. Because the method and system as disclosed herein converts caller information from an abbreviated format to an expanded format more suitable for text-to-speech synthesis, it significantly improves the overall quality of the voiced caller information presented to the subscriber. Moreover, the disclosed method and system permits pre-existing caller-ID databases to be integrated with commercially available text-to-speech synthesizers in a cost-effective manner.

Obviously, many modifications and variations of the present invention are possible in light of the above teachings. Thus, it is to be understood that, within the scope of the appended claims, the invention may be practiced otherwise than as specifically described above.

What is claimed is:

1. A method for removing an irregular character from caller information, the method comprising:
    receiving a call from a caller to a called party;
    searching a caller information database for caller information of the caller;
    receiving the caller information of the caller;
    removing at least one irregular character from the caller information of the caller; and
    establishing the call between the caller and the called party.

2. The method of claim 1 further comprising performing text-to-speech synthesis of the caller information after the at least one irregular character has been removed.

3. The method of claim 1, wherein the received caller information is in a first format, and wherein the method further comprises converting the caller information from the first format to a second format.

4. The method of claim 3, wherein the conversion from the first format to the second format is in accordance with a set of rules comprising a first subset of rules for business listings and a second subset of rules for residential listings.

5. The method of claim 4 further comprising determining whether the caller information contains a residential or business listing.

6. The method of claim 1 further comprising comparing the caller information to an exceptions table and, if the caller information corresponds to an entry in the exceptions table, generating a predetermined output.

7. The method of claim 1 further comprising comparing the caller information to a state name table.

8. A telecommunication system comprising:
    a caller information database comprising caller information of a plurality of parties;
    a service node operative to retrieve, from the caller information database, caller information of a caller making a call to a called party and remove at least one irregular character from the caller information of the caller; and
    at least one component operative to establish the call between the caller and the called party.

9. The system of claim 8, wherein the service node comprises an intelligent peripheral.

10. The system of claim 8, wherein the service node comprises a pre-processor and a text-to-speech synthesizer.

11. The system of claim 8, wherein the caller information is in a first format, and wherein the service node is operative to convert the caller information from the first format to a second format.

12. The system of claim 11, wherein the conversion from the first format to the second format is in accordance with a set of rules comprising a first subset of rules for business listings and a second subset of rules for residential listings.

13. The system of claim 12, wherein the service node is operative to determine whether the caller information contains a residential or business listing.

14. The system of claim 8, wherein the service node is operative to compare the caller information to an exceptions table and, if the caller information corresponds to an entry in the exceptions table, generate a predetermined output.

15. The system of claim 8, wherein the service node is operative to compare the caller information to a state name table.

16. A computer-usable memory storing at least one computer program, the at least one computer program operative to retrieve, from a caller information database, caller information of a caller making a call to a called party, remove at least one irregular character from the caller information of the caller, and establish the call between the caller and the called party.

17. The computer-usable memory of claim 16, wherein the computer-usable memory is part of a service node.

18. The computer-usable memory of claim 17, wherein the service node comprises an intelligent peripheral.

19. The computer-usable memory of claim 16, wherein the caller information is in a first format, and wherein the at least one computer program is operative to convert the caller information from the first format to a second format.

20. The computer-usable memory claim 16, wherein the at least one computer program is operative to communicate with a service switching point.

* * * * *